US005499695A

United States Patent [19]

Doom, Jr.

[11] Patent Number: 5,499,695

[45] Date of Patent: Mar. 19, 1996

[54] HOPPER-FED PISTON FILLER AND LIFT ASSEMBLY WORKSTATION

[76] Inventor: Lewis G. Doom, Jr., 28 Acorn La., Stoneybrook, N.Y. 11790

[21] Appl. No.: 200,637

[22] Filed: Feb. 23, 1994

[51] Int. Cl.[6] ................................ B66B 9/16; B66F 9/06; A21C 11/00

[52] U.S. Cl. .......................... 187/244; 187/234; 414/287; 222/160

[58] Field of Search .................................... 222/160, 185; 414/287, 420, 421, 680; 187/234, 238, 244, 272

[56] References Cited

U.S. PATENT DOCUMENTS

| | | | |
|---|---|---|---|
| 2,735,583 | 2/1956 | Misch | 222/160 X |
| 4,065,032 | 12/1977 | Lydiksen | 222/77 |
| 4,318,431 | 3/1982 | Evans | 222/70 X |
| 4,480,767 | 11/1984 | Brown | 222/340 |
| 4,545,463 | 10/1985 | Olovsson | 187/244 |
| 4,632,627 | 12/1986 | Swallows | 187/244 X |
| 4,797,050 | 1/1989 | Habicht | 414/420 |
| 4,995,781 | 2/1991 | Herzog | 414/680 |
| 5,199,533 | 4/1993 | Wilke | 187/244 |
| 5,205,699 | 4/1993 | Habicht | 414/420 |
| 5,257,890 | 11/1993 | Vicary | 414/420 |
| 5,344,275 | 9/1994 | Habicht | 414/420 |

FOREIGN PATENT DOCUMENTS

| | | | |
|---|---|---|---|
| 484063 | 9/1954 | Italy | 187/244 |

*Primary Examiner*—Michael S. Huppert
*Assistant Examiner*—Stephen Gordon
*Attorney, Agent, or Firm*—Kenneth E. Darnell

[57] ABSTRACT

A workstation for filling muffin pans and the like by means of a piston filler fed from a hopper located in surmounting relation to the piston filler, the invention further includes a lift assembly mounting the combined piston filler and hopper for vertical motion to facilitate removal of all material being dispensed from the hopper and to allow the hopper to be quickly and safely scraped and cleaned. The lift assembly of the invention holds the piston filler and hopper at an adjustable level above the floor which is best suited to the height of a user performing pan filling operations at the workstation, the lift assembly acting to controllably lower the piston filler and associated hopper not only for scraping and cleaning but also for filling of the hopper with bulk material which is to be dispensed. On filling of the hopper at or near a lowermost position, the lift assembly vertically lifts the piston filler and hopper vertically to a height best suited ergonomically to the height of a user for operating the piston filler. Filling, scraping and cleaning of the hopper is thereby performed at a safe level above the floor of the space within which the work station is located while actual operation of the piston filler takes place at an appropriate level above the floor for each user of the workstation.

19 Claims, 4 Drawing Sheets

HOPPER-FED PISTON FILLER AND LIFT ASSEMBLY WORKSTATION

BACKGROUND OF THE INVENTION

1. Field of the Invention

The invention relates generally to workstations wherein filling operations take place through feeding of material from a hopper through a filling device to a container intended to receive measured portions of the material. The invention relates particularly to a workstation wherein a hopper surmounting a piston filler or similar filler delivers bulk material to the filler which then deposits measured amounts of the material into a pan such as a muffin pan or the like, the filler and hopper being vertically moved between positions intended for scraping, cleaning and filling of the hopper and positions intended for conducting filling operations through the piston filler.

2. Background of the Invention

In dispensing operations such as occur in a number of manufacturing situations, difficulties often exist in cleaning, scraping and filling a bulk container which feeds a material to be dispensed into a dispenser especially when the dispenser itself must be positioned at a level above the floor of a work room which is compatible with the height of a workman conducting operations with the dispenser. In a work environment such as a baking operation wherein pans are brought either manually or automatically underneath a filling device whereby usually measured amounts of a material to be dispensed are dispensed into such pans, it is often difficult and even unsafe to attempt to clean, scrape or fill a bulk container surmounting the dispensing device since the open upper portion of the bulk container is usually located five to seven feet above the floor of the room within which manufacturing operations occur. Such situations usually involve dispensers such as piston fillers which are capable of dispensing measured quantities of a material into pans such as muffin pans, a common operation conducted either manually or automatically such as on a conveyor belt. In most such operations, an operator stands before a stationary table and brings a muffin pan into a position beneath the piston filler whereupon actuation of the piston filler causes measured amounts of muffin batter or the like to be dispensed into appropriate portions of the muffin pan. In such situations, the piston filler is fed by means of a hopper which surmounts the piston filler with the open upper portion of the hopper existing at a level of five feet or more above the floor of the room within which the filling operation occurs. In order to fill the hopper with muffin batter or the like it has previously been necessary to lift a bowl within which the batter has been mixed or a secondary container holding the batter to a height sufficiently high above the open upper portion of the hopper to allow tipping of the bowl and scraping of the bowl to cause all of the batter to be fed into the hopper. In some prior situations, workers actually climb ladders disposed on the sides of the piston filler/hopper and manually cause a bowl which contains batter to be tipped over above the hopper and then scraped to remove all batter in order to feed the hopper which then in turn feeds the piston filler. Such an operation is hazardous and, due to the difficulty of accomplishing a balancing act of this nature, inefficient and less than a favored activity of the worker who must accomplish this difficult task. Devices known as bowl lifts have previously been provided for lifting a bowl within which batter has been mixed to a position above the open upper portion of a hopper followed by tilting of the bowl and then scraping of the bowl manually to remove all batter from the bowl. In this situation, it is again necessary for a worker to climb a ladder positioned next to the piston filler/hopper combination and scrape out the bowl which has been lifted my means of the bowl lift to make certain that all material is removed from the bowl. The operation of scraping the bowl which has been lifted by the bowl lift above the level of the hopper is again hazardous due to its occurring at an unsafe height above the floor within which these manufacturing operations occur. Personnel conducting these operations can be injured if balance is lost while attempting to maintain a position on a ladder and scrape the interior of the bowl. In all of the situations described above, it is again necessary for operating personnel to ascend a ladder to scrape the walls of the hopper so that all material which is to be dispensed is utilized and dispensed through the piston filler. The danger of falling from a ladder during such a scraping operation is a clear danger which should be avoided where possible. Still further, the interior of a hopper after dispensing operations must be cleaned on a regular basis, at least once a day, after the scraping operation is conducted to remove batter from the walls of the hopper. This cleaning operation again occurs at a height of five feet or greater above the floor of a room within which the operations take place with personnel again being required to ascend a ladder to such a height and to clean the interior of a hopper utilized in the situations thus described. In situations where a bowl lift is utilized, substantial space is required for the bowl lift as well as for the piston filler/hopper which is located on a stationary table. In situations such as exist throughout the baking industry, very little space is available for a piece of equipment as large as a bowl lift and which is only required periodically during manufacturing operations for performance of a particular function, that is, the lifting of a bowl to a vertical position above a hopper for feeding of the hopper. In spite of the disadvantages inherent in the use of bowl lifts these prior art devices have represented the best previous approach to the situations thus described since bowl lift devices do at least eliminate the need for personnel to climb ladders with heavy bowls within which batter or the like has been mixed for feeding into the top of a hopper. Certainly, the use of bowl lifts still require personnel to ascend a ladder and scrape the bowl to remove all batter from the interior of the bowl. A bowl lift device previously available in the art is a device known as LIFTILTRUK bowl lifters, a trademark of Savage Bros. Company of Elk Grove Village, Illinois, these bowl lift devices representing a prior art approach to the solution of those problems referred to above. Similar problems have been addressed by Habicht in U.S. Pat. Nos. 4,954,037 and 5,205,699 which describe apparatus for vertically lifting a container within which a flowable material is present for feeding of the flowable material into a container located at a distance above floor level. The devices of Habicht are similar in general function and operation to the bowl lifting devices of Savage Bros. Company. Beaman et al in U.S. Pat. No. 3,035,725, provides a hoist which is intended to raise a dough bowl to a position allowing dispensing of dough within the bowl into a hopper. As such, the device of Beaman et al also is similar in function and operation to the LIFTILTRUK devices of Savage Bros. Company. While the devices discussed above, especially the bowl lift devices of Savage Bros. Company, represent some of the best solutions to the problems described above, problems still exist with these prior art devices especially problems relating to convenience and safety in the workplace as well as problems associated with the space available for conducting these manufacturing operations when it is necessary to use bowl lift devices, ladders and the like in order to fill a hopper typically located at or above eye level, to scrape a bowl filling such a hopper when the bowl is disposed at a substantial vertical height and to scrape and clean interior walls of a hopper when the open upper portion of the hopper is located at a height of five feet or greater above the floor of the workplace.

The present invention finds solution to the problems described above by providing a workstation at which filling operations occur and wherein a piston filler/hopper is mounted for vertical movement between a lowermost position wherein the interior of the hopper is easily accessible to an operator standing safely on the floor of a workplace and whereby the operator can easily and safely scrape and clean inner walls of the hopper without resort to ascension of a ladder to reach the interior of the hopper at a vertical level above the floor of the workplace which could cause injury to the operator if the operator fell from the ladder at such a height. This lowermost position of the piston filler/hopper further allows safe and efficient filling of the hopper from a mixing bowl or the like at a level above the floor of the workplace whereby an operator can safely stand on the floor and tilt a bowl containing batter or similar material and discharge the contents of the bowl into the hopper and even scrape walls of the bowl to feed all material within the bowl into the hopper without the need for ascending a ladder or similar device to accomplish filling of the hopper at an unsafe vertical level above the floor of the workplace. The workstation of the invention further contemplates the vertical elevation of the piston filler/hopper to a level convenient for an operator to feed pans such as muffin pans and the like into a relation with the piston filler to allow measured quantities of muffin batter or the like to be dispensed into the pan, this height being adjustable to the particular height of the operator so that the operator can conduct filling operations with a high degree of comfort and convenience. The workstation of the invention which includes a filler/hopper and apparatus for mounting the filler/hopper for vertical movement between desirable levels above the floor of a workplace thus produces substantial advantages in the workplace due to the saving of space and due to the ease of operation and safety of operation which occurs through use of the present workstation. The invention thus provides substantial advantages when compared to the devices and associated methodology of the prior art.

SUMMARY OF THE INVENTION

The invention provides a workstation such as is utilized for the filling of containers by means of a dispenser or filling device and wherein the filling device is fed by means of a hopper surmounting the filling device, the combination of the filling device and hopper being capable of vertical elevation between upper and lower positions whereby dispensing operations can occur, such as at an upper position, and whereby filling, scraping and cleaning operations can occur when the filling device/hopper is located at or near a lowermost position. The apparatus of the invention is particularly useful in bakery operations such as in the filling of muffin pans with measured amounts of muffin batter or the like through a filling device such as a piston filler fed from a hopper located in surmounting relation to the piston filler. The apparatus of the invention further includes a lifting assembly mounting the combined piston filler and hopper for vertical motion to allow the filler and hopper to be moved to a lowermost position for filling of the hopper such as from a mixing bowl or the like and at which position the mixing bowl can be safely tilted to discharge batter or the like into the hopper followed by scraping of the mixing bowl to remove all material therefrom, followed by vertical lifting of the filler and hopper to a vertical height allowing filling of muffin pans or the like fed into a desired relation with the piston filler so that measured quantities of the batter can be dispensed into the pan. The vertical height to which the filler and hopper is lifted by the present apparatus is adjustable to accommodate the height of an operator. After pan filling operations, the present apparatus vertically lowers the piston filler and hopper combination to a lowermost position for scraping of interior walls of the hopper to remove all batter from the hopper. As necessary, the hopper can be cleaned according to sanitary standards when the piston filler and hopper combination are located at this lowered position which can be taken to be at or near the lowermost vertical position to which the filler and hopper combination can be positioned. The structure and operation of the present invention allows safe and convenient use of a hopper-fed filling device by obviating the need for an operator to ascend a ladder or the like to assist in filling of the hopper or in scraping of either the hopper or a bowl used to feed the hopper and also to allow cleaning of the hopper when the hopper is at a location above the floor of a workplace which allows the operator to stand on said floor while conducting cleaning operations. The particular structure of the present workstation also saves substantial space in a work area such as an area used for baking operations wherein space is at a premium. The present structure further includes apparatus allowing rolling movement of the combined structure as desired and which allows holding of the apparatus in place automatically when the filler and hopper are located at a dispensing position, that is, at a position at or near the uppermost position of the filler and hopper.

Accordingly, it is a primary object of the invention to provide workstation apparatus wherein a filling device fed by a hopper or the like can be mounted for vertical movement between positions allowing safe and convenient filling and cleaning of the hopper and positions allowing filling operations.

It is another object of the invention to provide apparatus effectively forming a workstation for filling operations such as filling muffin pans and the like by means of a piston filler fed from a hopper located in surmounting relation to the filler and wherein the apparatus includes an integral lifting mechanism mounting the filler and hopper for vertical movement to facilitate filling, scraping and cleaning of the hopper in a safe and convenient manner.

It is a further object of the invention to provide a workstation for filling operations and which can be used by an operator with convenience and with safety.

Further objects and advantages of the invention will become more readily apparent in light of the following detailed description of the preferred embodiments.

DESCRIPTION OF THE PREFERRED EMBODIMENTS

Figure 1:
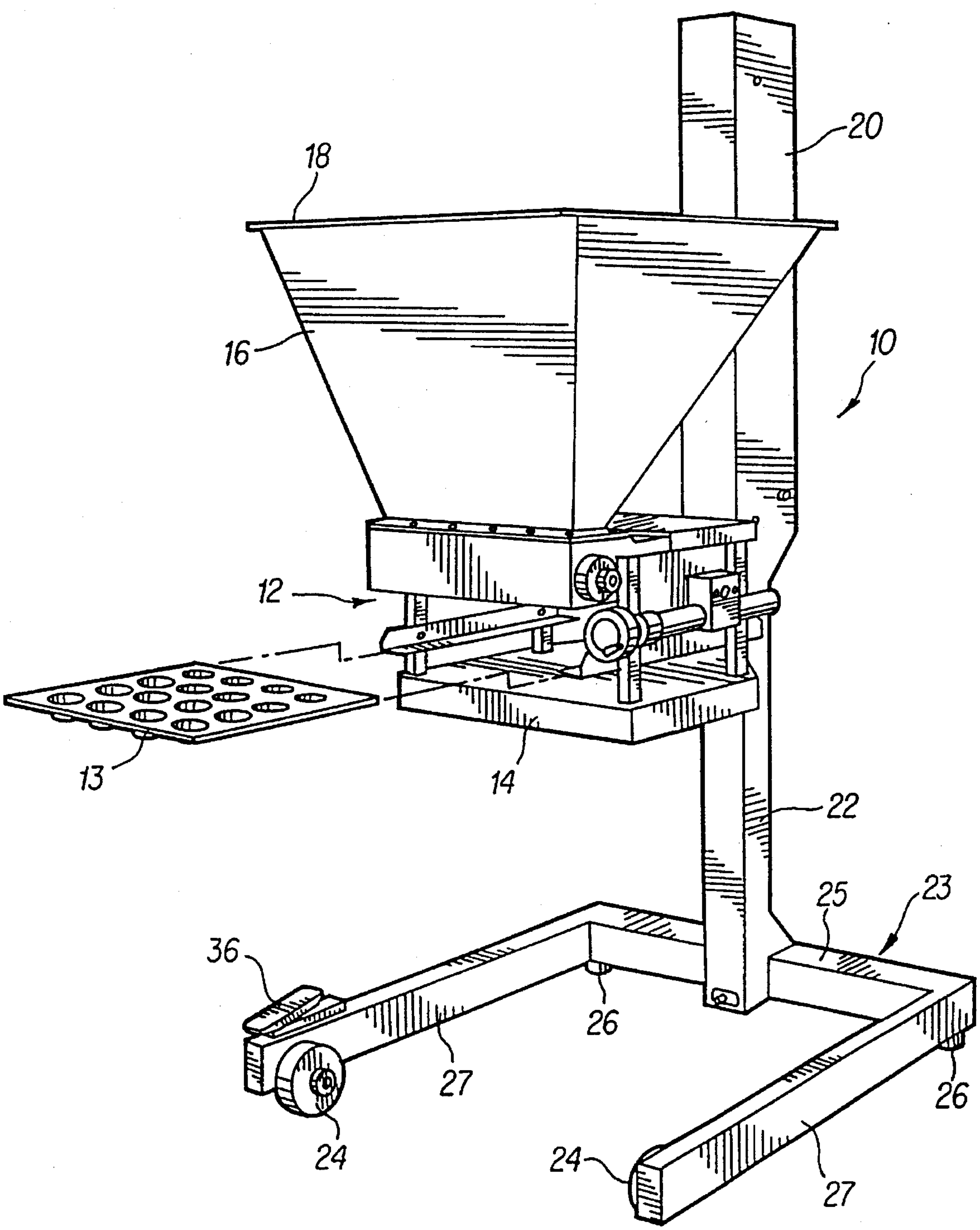
FIG. 1 is a perspective view of the present workstation showing the piston filler/hopper in a vertical position wherein pan filling operations occur.

Referring now to the drawings and particularly to FIG. 1, the apparatus of the invention is seen to comprise a workstation 10 including a piston filler 12 mounted to a vertically displaceable shelf 14, the piston filler 12 being fed by means of a hopper 16 mounted in surmounting relation to the piston filler 12. The piston filler 12 and the associated hopper 16 are substantially conventional in the art and are of a construction such as is manufactured and marketed by Goodway Industries, Inc. of Bohemia, N.Y. The piston filler 12 and the hopper 16 in combination are marketed by Goodway Industries, Inc. under the designation "Table Top Depositor" and is intended in the prior art configuration thereof to be mounted upon a stationary table top (not shown). Since the piston filler 12 and the associated hopper 16 are of conventional design, these structural portions of the present workstation 10 will not be described in detail except to the degree necessary to appreciate the operation of the workstation 10. Bulk material such as muffin batter or the like is received through opening 18 of the hopper 16 with the hopper 16 acting to contain the bulk material for gravity feed to the piston filler 12. An operator of the workstation 10 stands in front of said workstation 10 as seen in FIG. 1 to insert a muffin pan 13 beneath the piston filler 12 which, on actuation of said piston filler 12 by a conventional foot pedal or the like, causes measured quantities of the muffin batter to be dispensed from the piston filler 12 into the muffin pan 13. The operation of the piston filler 12 including filling of a muffin pan is known in the art.

It is to be understood that the workstation 10 will be described in a preferred embodiment thereof as relating to the baking environment wherein muffin pans or the like are filled with a batter which is to be baked after the filling operation is completed. It is to be understood that the workstation 10 could be otherwise configured with various filling devices which could be substituted for the piston filler 12 and various gravity-feed bulk material containers in place of the hopper 16 without departing from the scope of the invention and without negating the several and substantial advantages of the invention. The environment of the workstation 10 as will be described herein is simply a particular environment wherein the structure of the workstation 10 finds substantial utility. Clearly, the teachings of the invention will lead a person of ordinary skill in the art to utilize the present teachings in environments wherein bulk materials other than muffin batter or the like is dispensed or deposited.

In order for an operator of the workstation 10 to stand at his natural height for bringing a muffin pan into an appropriate relation with the piston filler 12, it is necessary for the shelf 14 to be located at a height of 2½ to 4 feet above the floor of a workspace in which the workstation is located so that the piston filler 12 can be conveniently and comfortably operated. Due to the dimensions of the piston filler 12 and of the associated hopper 16, the opening 18 of the hopper is located at an elevation of five feet or more above the floor of the workspace. If the hopper 16 could only be filled manually by the tilting of a mixing bowl to pour bulk material into the opening 18, it would be necessary for personnel to ascend ladders stationed beside the workstation 10 in order to accomplish discharge of the bulk material into the hopper 16 and scraping of the bowl (not shown) so that all material is charged into the hopper 16. It can readily be seen that the lifting of a large bowl of bulk material would be difficult if not impossible and certainly dangerous for personnel who would need to ascend a ladder to accomplish this function. If the hopper 16 were to be filled with a bowl lift such as is known in the art, it would be necessary for personnel to ascend a ladder stationed beside the workstation 10 to facilitate tilting of the bowl (not shown) and scraping of the bowl so that all bulk material is discharged into the hopper 16. In this situation, personnel would still need to ascend a ladder and thus be subject to falling with the attendant possibility of injury.

Figure 2:
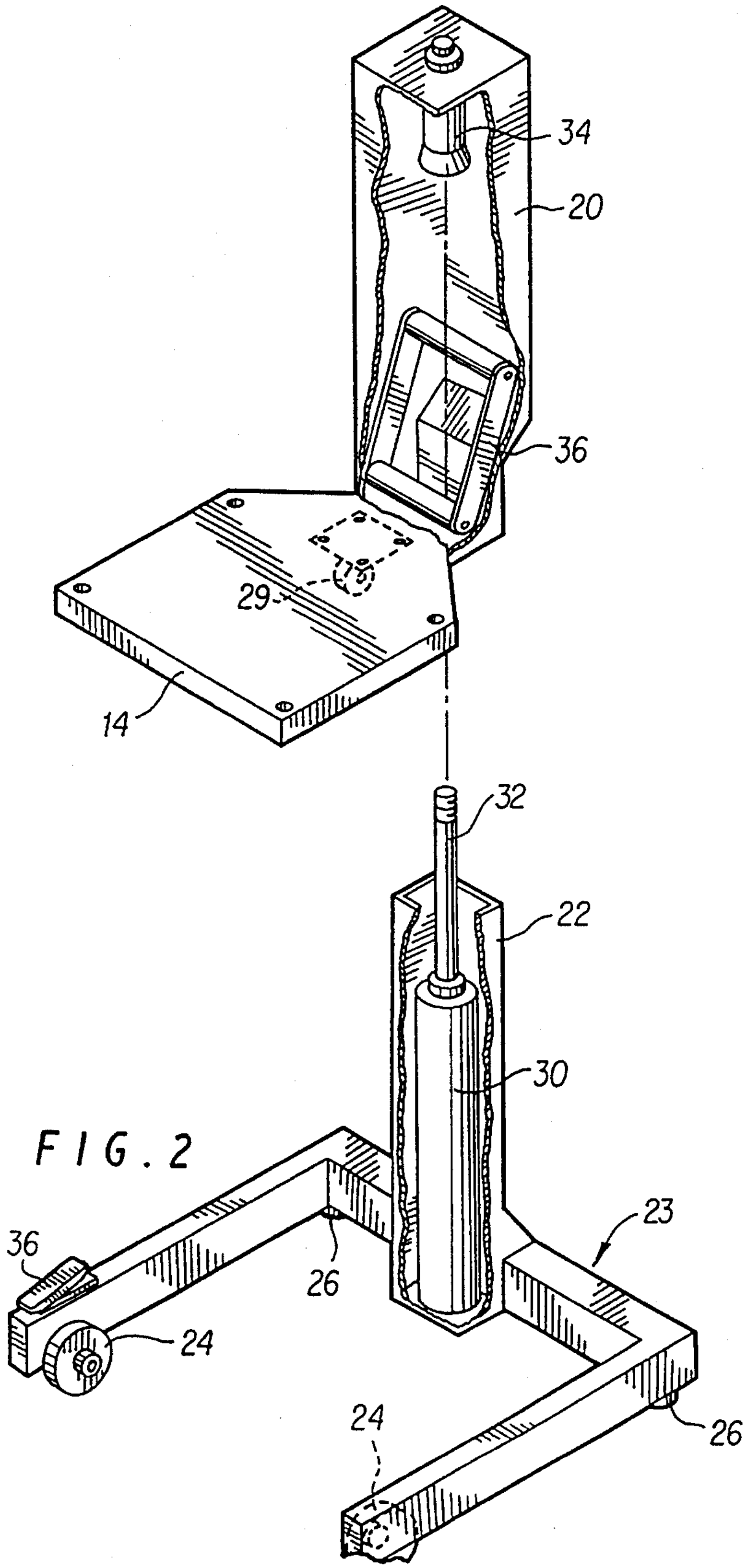
FIG. 2 is an exploded assembly view of the present workstation illustrating the relationship between relatively movable portions of the structure, the piston filler/hopper being removed for clarity of illustration.
Figure 3:
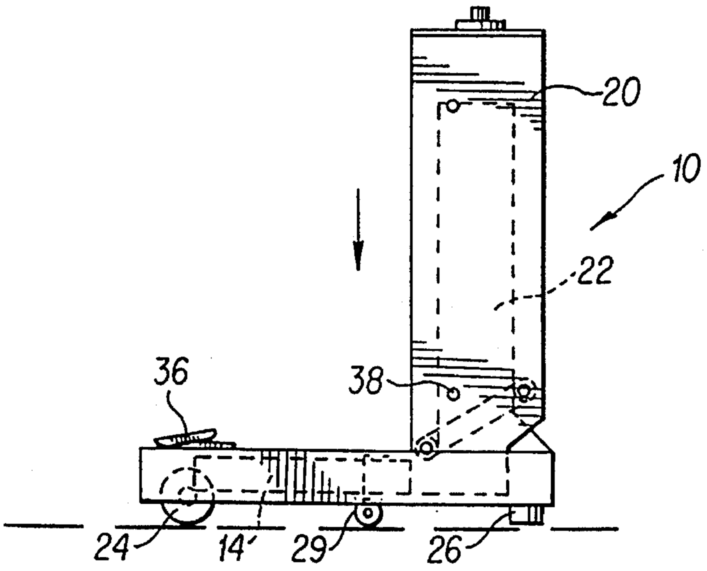
FIG. 3 is an elevational view of the present workstation in a position at or near the lowermost position such as the position at which cleaning and filling occur, the piston filler/hopper being removed for clarity of illustration.

However, the workstation 10 is provided with the vertically displaceable shelf 14 which is moved vertically downwardly from the position shown in FIG. 1 to the position shown in FIG. 3 when it is necessary to fill the hopper 16. As best seen in FIG. 2, the shelf 14 mounts to upper post 20 which telescopes over lower post 22, the lower post 22 being mounted to a bifurcated base 23 at bight portion 25 thereof. Legs 27 of the base 23 are provided at their ends with rollers 24 so that the workstation 10 can be moved about the workspace as desired when in the position of FIG. 3. Lowering of the piston filler 12 and the associated hopper 16 causes the opening 18 of the hopper to be located at an elevation above the floor of the workspace which allows ready charging of bulk material from a bowl (not shown) or similar container into the hopper 16 without the necessity for personnel to ascend ladders or similar devices for tilting of the bowl and for scraping of the bowl to charge all bulk material into the hopper 16.

Figure 4:
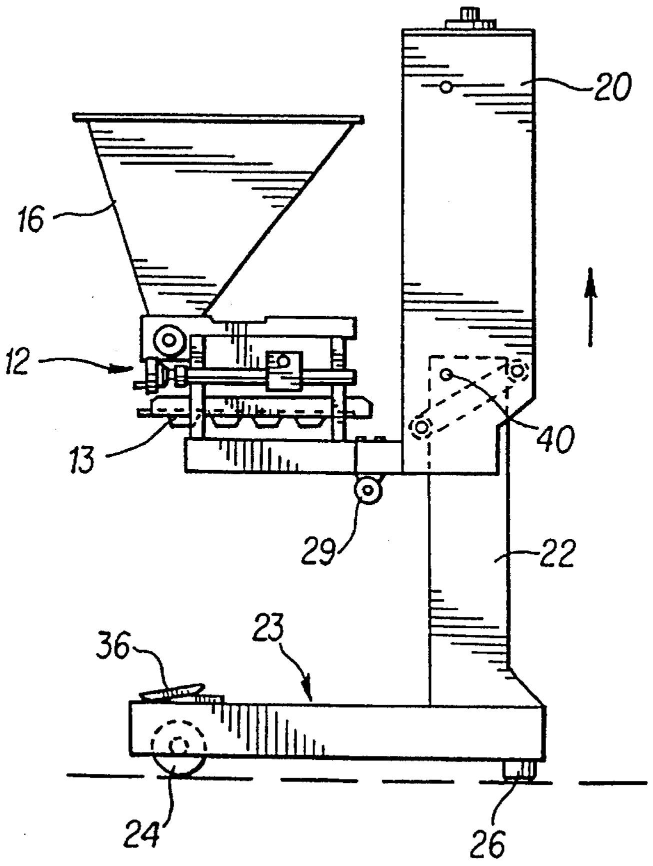
FIG. 4 is an elevational view illustrating the position of the piston filler/hopper at or near a maximum vertically upward extension, such a position being that position at which filling operations occur.
Figure 5:
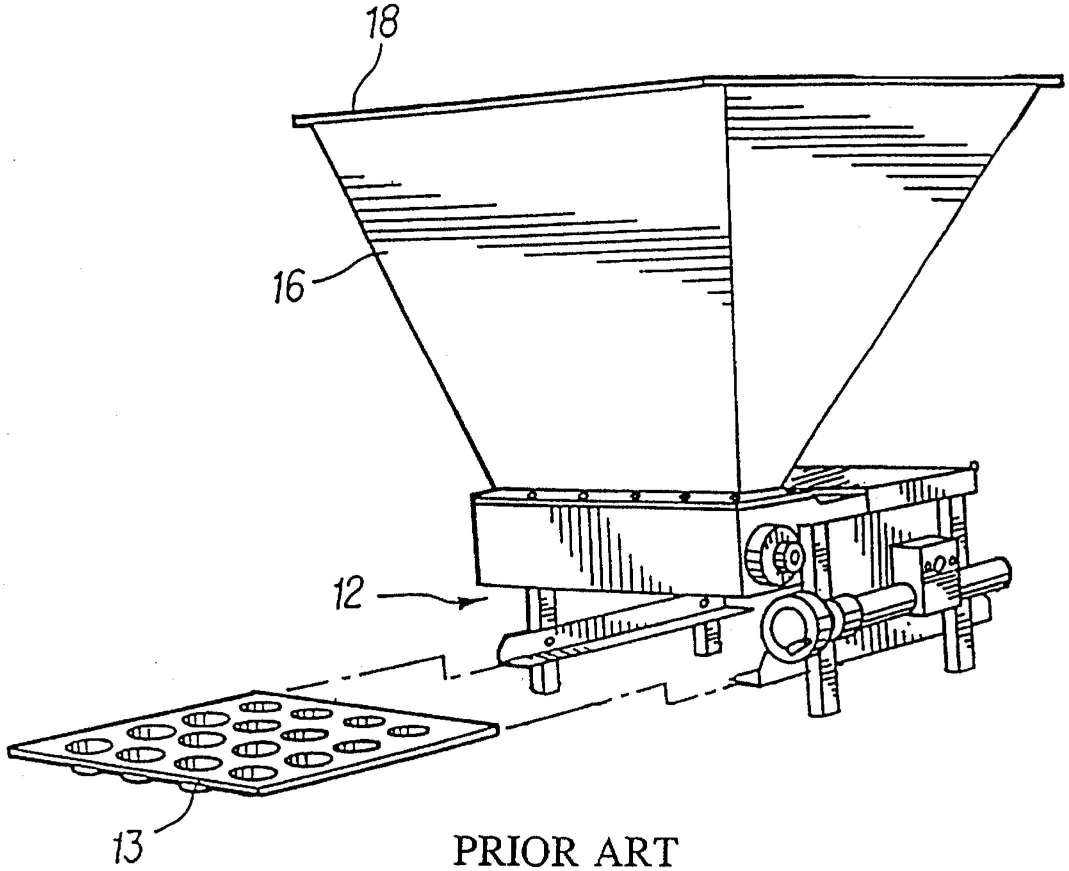
PRIOR ART FIG. 5
FIG. 5 is a perspective view of a piston filler/hopper of the prior art which is useful as a subassembly of the present workstation.

Once the hopper 16 is filled, the shelf 14 is vertically displaced to the operating position shown in FIG. 1 or in FIG. 4, it being possible to adjust the height of the shelf 14 above the floor of the workspace so that the piston filler 12 is suitably located at the most desirable height for an operator based upon the height and physical conformation of the operator. At the end of a dispensing operation, the shelf 14 is returned to a location at or near the lowermost position thereof as seen in FIG. 3 so that the internal walls of the hopper 16 can be scraped to push bulk material clinging to inner walls of the hopper 16 into the piston filler 12 so that the last "panful" of material can be utilized. The ability of the present workstation 10 to lower the piston filler 12/hopper 16 to a position near the floor of the workspace allows scraping of the internal walls of the hopper 16 without the necessity for personnel to ascend a ladder to a position five feet or more above the floor of the workspace for scraping of inner walls of the hopper 16.

It is to be understood that the piston filler 12 and the hopper 16 have been removed from the shelf 14 in FIG. 3 solely for ease and clarity of illustration. For the same reasons, the piston filler 12 and the hopper 16 are not shown as being mounted to the shelf 14 of FIG. 2.

The piston filler 12 and the associated hopper 16 are disposed at or near the lowermost position of the shelf 14 when cleaning of the hopper 16 and of the piston filler 12 is necessary. This lowermost position of the shelf 14 is best seen in FIG. 3. Personnel assigned to the cleaning of the workstation 10 can readily and safely clean the interior of the hopper 16 inter alia with greater safety than has heretofore been possible in the art. The volumetrically efficient arrangement of the present workstation 10 further conserves precious space within a workspace since apparatus such as tables, bowl lifts, ladders, etc. are not necessary for operation of the piston filler 12 and the associated hopper 16. Further, the operations required, that is, filling, scraping, cleaning and the like, can be accomplished with much greater safety due to lowering of the shelf 14 and thus of the piston filler 12 and the hopper 16 to a position at or near the lowermost vertical elevation of the shelf 14 as seen in FIG. 3.

As seen in FIG. 1 and also in FIG. 4, stabilizing posts 26 are seen to come in contact with the floor of the workspace on elevation of the shelf 14 to a vertical position whereby stabilizing wheel 29 moves out of contact with the floor. The stabilizing posts 26 retain the workstation 10 in place during dispensing operations in order to provide additional safety to an operator. When the stabilizing wheel 29 is in contact with the floor at or near the lowermost position of the shelf 14, the stabilizing posts 26 do not contact the floor and the combination of the wheels 24 and the wheel 29 allow wheeling of the workstation 10 from place to place, such as from the workspace within which dispensing operations occur into a washroom wherein the apparatus can be readily and safely cleaned.

As is best seen in FIG. 2, an air cylinder 30 is located within the lower post 22 and acts to elevate and lower the upper post 20 and attached shelf 14 through displaceable rod 32. The outer end of the rod 32 connects to a swivel joint attachment 34 bolted to the top of the upper internal wall of the upper post 20. Operation of the air cylinder 30 occurs through foot pedal 36, control structure connecting the foot pedal 36 to the air cylinder 30 through that leg 27 of the base 23 on which the foot pedal 36 is mounted. Such control connections are conventional in the art.

Guide roller arrangement 36 is mounted within the interior of the upper post 20 to receive the lower post 22 for maintenance of the posts 20 and 22 in linear alignment and to allow the upper post 20 to move relative to the lower post 22. As best seen in FIG. 3, a pin 38 is used to lock the posts 20 and 22 relative to each other in the "lowermost" position of the workstation 10. Similarly, a pin 40 is best seen in FIG. 4 as a means to lock the posts 20 and 22 relative to each other in the "uppermost" position of the workstation 10.

It is to be understood a number of elevating mechanisms can be utilized to displace the shelf 14 and thus the piston filler 12 and the hopper 16. Such mechanisms, which include "scissor" elevators inter alia, can be electrically operated, hydraulically operated or even manually operated. Control mechanisms useful for controlling the operation of such mechanisms are also known in the art and can be used without departing from the scope of the invention.

Accordingly, it is to be understood that the workstation 10 of the invention can be configured other than is explicitly shown in the drawings and described hereinabove without departing from the scope of the invention. The substantial advantages which have been described herein can be obtained even though the several structural elements of the workstation 10 be configured other than as is shown and described above. In particular, the piston filler 12 can take the form of other filling devices and the hopper 16 can take the form of other, similar bulk material containing and feeding devices. Further, the structure of that mechanism used to vertically displace the shelf 14 and attached piston filler/hopper can take a variety of forms as can be understood in light of the description contained herein, the scope of the invention being limited only by the recitations of the appended claims.

What is claimed is:

1. In a workstation for dispensing of a bulk material into a receiving container which can be filled at the workstation, the workstation including a filling device fed by a bulk material container disposed in a relation to the filling device suitable to feed said bulk material into the filling device, the improvement comprising:

support means for mounting the filling device and the bulk material container thereon in a manner suitable for operation of the filling device and of the bulk material container to fill the receiving container, the support means comprising a platform member having an upper surface onto which the filling device is mounted, the upper surface of the platform member comprising a work surface; and, elevating means mounting the support means including the platform member and thus the filling device and the bulk material container for adjustably displacing the platform member and thus the work surface through a range of vertically related positions to a position suitable for operation of the filling device to fill the receiving container by an operator of the workstation, at least one of said positions being suitable to the height of a given operator for operation of the filling device on the work surface, the platform member mounting the filling device throughout the vertical displacement range of the elevating means, and a relatively lower position at which the bulk material container can be safely and efficiently filled with bulk material, safely and efficiently scraped on the inner walls thereof to charge all bulk material into the filling device, and safely and efficiently cleaned by an operator standing on a floor of a workspace within which the workstation is located.

2. The improved workstation of claim 1 wherein the relatively lower position is at or near the lowermost position to which the bulk material container can be lowered.

3. The improved workstation of claim 1 wherein the filling device comprises a piston filler.

4. The improved workstation of claim 1 wherein the bulk material container comprises a hopper.

5. The improved workstation of claim 1 wherein the bulk material container comprises a hopper disposed in surmounting relation to the filling device.

6. The improved workstation of claim 1 wherein the filling device comprises a piston filler and the bulk material container comprises a hopper disposed in surmounting relation to the piston filler.

7. The improved workstation of claim 1 and further comprising control means carried by the workstation for controlling the operation of the elevating means.

8. In a workstation for dispensing of a bulk material into a receiving container being filled at the workstation, the workstation including a filling device fed by a bulk material container surmounting the filling device, whereby an operator of the workstation places the receiving container in a relation to the filling device to fill the receiving container by dispensing of the bulk material from the filling device, the improvement comprising:

a shelf mounting the filling device and the bulk material container over an upper surface of the shelf, the upper surface of the shelf comprising a work surface, the shelf and the work surface provided by the shelf as well as the filling device mounted to the shelf being adjustably displaceable vertically between a multiplicity of vertically related positions best suited to the height of the operator and a relatively lower position suitable for filling, scraping and cleaning of the bulk material container, the shelf acting to mount the filling device and the bulk material container throughout the vertical displacement range of the shelf; and, elevating means mounting the shelf and thus the filling device and the bulk material container for adjusting the vertical location of the shelf between said multiplicity of vertically related positions at which the filling device carried by the shelf can be operated to fill the receiving container and at least one of the positions being suited to the height of a given operator for operation of the filling device and said relatively lower position being suitable for filling, scraping and cleaning of the bulk material container.

9. The improved workstation of claim 8 wherein the elevating means comprise an upper post to which the shelf is attached, the upper post having a channel formed therein, a lower post receivable within the channel in the upper post for reciprocal movement therein, motive means carried by the lower post and attached to the upper post for moving the upper post vertically relative to the lower post, a base member to which the lower post is attached for supporting the upper and lower posts, and means carried by the upper post to guide the lower post during reciprocal movement of the upper post relative to the lower post and to maintain the posts in alignment with each other.

10. The improved workstation of claim 9 wherein the motive means comprises an air cylinder carried by the lower post and a rod carried by the air cylinder and movable reciprocally thereby, a distal end of the rod being attached to the upper post to vertically displace the upper post on reciprocation of the rod by the air cylinder.

11. The improved workstation of claim 9 and further comprising wheel means mounted for rolling movement by the base member, means carried by the shelf for engaging a floor on which the workstation is disposed and comprising at least one post, and a roller carried by the shelf, the at least one post engaging the floor when the roller carried by the shelf is elevated to a degree such that the roller does not contact the floor, the workstation being immobile when the at least one post engages the floor, the at least one post disengaging the floor on lowering of the shelf so that the roller engages the floor, the roller engaging the floor at or near the relatively lower position of the shelf and of the filling device attached thereto, the workstation being thereby capable of mobility on contact between the floor and the wheel means and roller.

12. The improved workstation of claim 8 and further comprising control means carried by the workstation for controlling the operation of the elevating means.

13. In a workstation for dispensing of a bulk material into a receiving container which can be filled at the workstation, the workstation including a filling device fed by a bulk material container disposed in a relation to the filling device suitable to feed said bulk material into the filling device, the improvement comprising:

support means for mounting the filling device and the bulk material container thereon in a manner suitable for operation of the filling device and of the bulk material container to fill the receiving container; and elevating means mounting the support means and thus the filling device and the bulk material container for adjusting the vertical location of the support means between a multiplicity of vertically related positions at which the filling device can be operated to fill the receiving container and at least one of said positions being suitable to the height of a given operator for operation of the filling device and a relatively lower position at which the bulk material container can be safely and efficiently filled with bulk material, safely and efficiently scraped on the inner walls thereof to charge bulk material into the filling device, and safely and efficiently cleaned by an operator standing on a floor of a workspace within which the workstation is located, the elevating means comprising an upper post to which the support means is attached, the upper post having a channel formed therein, a lower post receivable within the channel in the upper post for reciprocal movement therein, motive means carried by the lower post and attached to the upper post for moving the upper post vertically relative to the lower post, a base member to which the lower post is attached for supporting the upper and lower posts, and means carried by the upper post for guiding the lower post during reciprocal movement of the lower post relative to the upper post and for maintaining the posts in alignment with each other.

14. The improved workstation of claim 13 wherein the motive means comprises an air cylinder carried by the lower post and a rod carried by the air cylinder and movable reciprocally thereby, a distal end of the rod being attached to the upper post to vertically displace the upper post on reciprocation of the rod by the air cylinder.

15. The improved workstation of claim 13 wherein the support means comprises a platform member having at least one surface onto which the filling device is mounted, said surface of the platform member comprising a work surface, the work surface being adjustably displaceable through a range of vertically related positions by the elevating means to a position suitable for operation of the filling device by an operator of the workstation, the platform member mounting the filling device throughout the vertical displacement range of the elevating means.

16. The improved workstation of claim 15 and further comprising wheel means mounted for rolling movement by the base member, means carried by the base member for engaging a floor on which the workstation is disposed and comprising at least one post, and a roller carried by the platform member, the at least one post engaging the floor when the roller carried by the platform member is elevated to a degree such that the roller does not contact the floor, the workstation being immobile when the at least one post engages the floor, the at least one post disengaging the floor on lowering of the platform member such that the roller engages the floor, the roller engaging the floor at or near the relatively lower position of the platform member and the filling device attached thereto, the workstation being thereby capable of mobility on contact between the floor and the wheel means and roller.

17. The improved workstation of claim 13 and further comprising control means carried by the workstation and operably connected to the motive means for vertically displacing the upper post to which the support means is attached.

18. The improved workstation of claim 17 wherein the motive means comprises an air cylinder carried by the lower post and a rod carried by the air cylinder and movable reciprocally thereby, a distal end of the rod being attached to the upper post to vertically displace the upper post on reciprocation of the rod by the air cylinder.

19. The improved workstation of claim 18 and further comprising wheel means mounted for rolling movement by the base member, means carried by the base member for engaging a floor on which the workstation is disposed and comprising at least one post, and a roller carried by the platform member, the at least one post engaging the floor when the roller carried by the platform member is elevated to a degree such that the roller does not contact the floor, the workstation being immobile when the at least one post engages the floor, the at least one post disengaging the floor on lowering of the platform member such that the roller engages the floor, the roller engaging the floor at or near the relatively lower position of the platform member and the filling device attached thereto, the workstation being thereby immobile on contact between the floor and the wheel means and roller.

* * * * *